(12) United States Patent
Lee

(10) Patent No.: US 11,770,352 B2
(45) Date of Patent: Sep. 26, 2023

(54) METHOD AND APPARATUS FOR PROVIDING CHAT SERVICE INCLUDING EXPRESSION ITEMS

(71) Applicant: Platfarm Inc., Seoul (KR)

(72) Inventor: Hyo Sub Lee, Seoul (KR)

(73) Assignee: Platfarm Inc., Seoul (KR)

( * ) Notice: Subject to any disclaimer, the term of this patent is extended or adjusted under 35 U.S.C. 154(b) by 80 days.

(21) Appl. No.: 17/241,539

(22) Filed: Apr. 27, 2021

(65) Prior Publication Data
US 2022/0182343 A1 Jun. 9, 2022

(30) Foreign Application Priority Data

Dec. 4, 2020 (KR) .................. 10-2020-0169011

(51) Int. Cl.
| | |
|---|---|
| *H04L 51/10* | (2022.01) |
| *G06F 40/30* | (2020.01) |
| *G06N 5/04* | (2023.01) |
| *G10L 15/22* | (2006.01) |
| *G06N 20/00* | (2019.01) |
| *G10L 15/18* | (2013.01) |
| *G06V 20/10* | (2022.01) |

(52) U.S. Cl.
CPC .............. *H04L 51/10* (2013.01); *G06F 40/30* (2020.01); *G06N 5/04* (2013.01); *G06N 20/00* (2019.01); *G06V 20/10* (2022.01); *G10L 15/1815* (2013.01); *G10L 15/22* (2013.01)

(58) Field of Classification Search
CPC ....... H04L 51/10; H04L 51/046; G06F 40/30; G06F 16/252; G06F 40/10; G06F 40/205; G06N 5/04; G06N 20/00; G06V 20/10; G10L 15/1815; G10L 15/22; G10L 17/06; G06Q 50/30
See application file for complete search history.

(56) References Cited

U.S. PATENT DOCUMENTS

| | | | |
|---|---|---|---|
| 11,393,133 B2* | 7/2022 | el Kaliouby | G06T 11/00 |
| 2019/0087691 A1* | 3/2019 | Jelveh | G06N 3/084 |
| 2019/0392394 A1* | 12/2019 | Druck | G06Q 30/0241 |

FOREIGN PATENT DOCUMENTS

| | | |
|---|---|---|
| KR | 10-2021-0041209 A | 4/2021 |
| KR | 10-2021-0041211 A | 4/2021 |

* cited by examiner

*Primary Examiner* — Sm A Rahman
(74) *Attorney, Agent, or Firm* — IP & T GROUP LLP

(57) ABSTRACT

A chat service providing apparatus may include a message analyzer and an artificial intelligence processor. The message analyzer may identify a first expression item included in at least one chat message received from a user terminal, analyze an attribute allocated to the first expression item on the basis of an analysis medium frame, and determine a user's intention according to a result of analyzing the attribute. The artificial intelligence processor may recommend a second expression item from among a plurality of registered expression items on the basis of a conversion condition which is an algorithm for selecting an expression item having an attribute corresponding to the user's intention among the plurality of expression items. The analysis medium frame may include, as an attribute, at least one of a description of an expression item, a reference emoji, a representative intension, and a representative language.

18 Claims, 14 Drawing Sheets

FIG. 2
1. Select three emotions that can express stickers in a more relevant order.
(Choice of up to 3 selections)
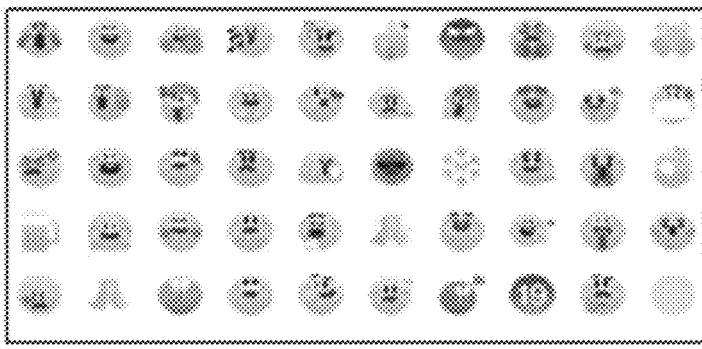
○ ● : Soothing
○ ● : Sad
● ● : Comfortable
2. Please select the language of the sticker.
(A sticker including English words understandable from common sense should be categorized in an neutral.)

FIG. 6

| No | Name | Description Filed | | | Analysis Medium | | | |
|---|---|---|---|---|---|---|---|---|
| | | Description | Emoji | | Frame | Language | Sentiment | General |
| 1 | Emoji | Description | Emoji | | | | ○ | ○ |
| 2 | Extensible emoji | Description | Emoji | Extensible emoji | | | ○ | ○ |
| 3 | Text | Description | Emoji | Extensible emoji | Text | | ○ | ○ | ○ |
| 4 | Voice | Description | Emoji | Extensible emoji | Text | Pronunciation symbol | | ○ | ○ | ○ |
| 5 | Sound | Description | Emoji | Extensible emoji | Text | Pronunciation symbol | | ○ | ○ | ○ |
| 6 | Video | Description | Emoji | Extensible emoji | Text | Pronunciation symbol | Video | ○ | ○ | ○ |
| 7 | Image | Description | Emoji | Extensible emoji | Text | Pronunciation symbol | Animation/Gif | ○ | ○ | ○ |

METHOD AND APPARATUS FOR PROVIDING CHAT SERVICE INCLUDING EXPRESSION ITEMS

CROSS-REFERENCE TO RELATED APPLICATIONS

This application claims priority to and the benefit of Korean Patent Application No. 10-2020-0169011, filed on Dec. 4, 2020, the disclosure of which is incorporated herein by reference in its entirety.

BACKGROUND

1. Field of the Invention

The present disclosure relates to a method and apparatus for providing a chat service, and more particularly, to a method and apparatus for providing a chat service including expression items.

2. Discussion of Related Art

In applications or the like provided on web pages in the Internet or through a smart phone, expression items are used to express people's emotions or actions. Such expression items are also referred to as emoticons, stickers, emojis, or the like.

In the beginning, expression items were each composed of a simple combination of various symbols and text that are inputtable through a keypad but have recently been embodied in various forms such as images, short videos, etc.

Emojis are similar to emoticons, stickers or the like in that they are images or icons used to express people's emotions or actions but are different from emoticons, stickers or the like in that emojis are standardized in unicode and thus predetermined images or icons corresponding to the unicode are output through the unicode.

Emoticons, stickers, emojis and the like as described above are mainly used most actively in chat services that provide a service that allows users to exchange messages with each other. For example, in existing chat services, when a user selects a group of emoticons for expressing emotions to a counterpart, pre-prepared emoticons included in the selected group are displayed, and when the user selects one of the displayed emoticons, the selected emoticon is displayed.

However, in the existing chat services, a user should directly consider and select an emoticon and the like to express an emotion and thus it will take a great deal of time to determine an emoticon for quickly expressing his or her emotion.

SUMMARY OF THE INVENTION

To address the above-described problem, the present disclosure is directed to a chat service providing method and apparatus for determining a user's emotion or intention and recommending an expression item matching the user's emotion or intention by converting between expression items having various forms such as images, videos, text, etc. and learning expression items and text chat messages using a deep learning network.

According to an aspect of the present disclosure, the chat service providing apparatus includes a message analyzer and an artificial intelligence processor. The message analyzer may identify a first expression item included in at least one chat message received from a user terminal, analyze an attribute allocated to the first expression item on the basis of an analysis medium frame, and determine a user's intention according to a result of analyzing the attribute. The artificial intelligence processor may recommend a second expression item among a plurality of registered expression items on the basis of a conversion condition which is an algorithm for selecting an expression item having an attribute corresponding to the user's intention from among the plurality of expression items. The analysis medium frame may include, as an attribute, at least one of a description of an expression item, a reference emoji, a representative intention, and a representative language.

According to another aspect of the present disclosure, a method of providing a chat service includes identifying a first expression item included in at least one chat message received from a user terminal; analyzing an attribute allocated to the first expression item on the basis of an analysis medium frame; determining a user's intention on the basis of a result of analyzing the attribute; and recommending a second expression item among a plurality of registered expression items on the basis of a conversion condition which is an algorithm for selecting an expression item having an attribute corresponding to the user's intention from among the plurality of expression items. The analysis medium frame may include, as an attribute, at least one of a description of an expression item, a reference emoji, a representative intention, and a representative language.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a diagram illustrating a registration interface for registering an expression item in a chat service providing apparatus by an item registration terminal of FIG. 1;

FIG. 6 is a diagram illustrating an analysis medium for classifying expression items according to an embodiment;

DETAILED DESCRIPTION OF EXEMPLARY EMBODIMENTS

Figure 1:
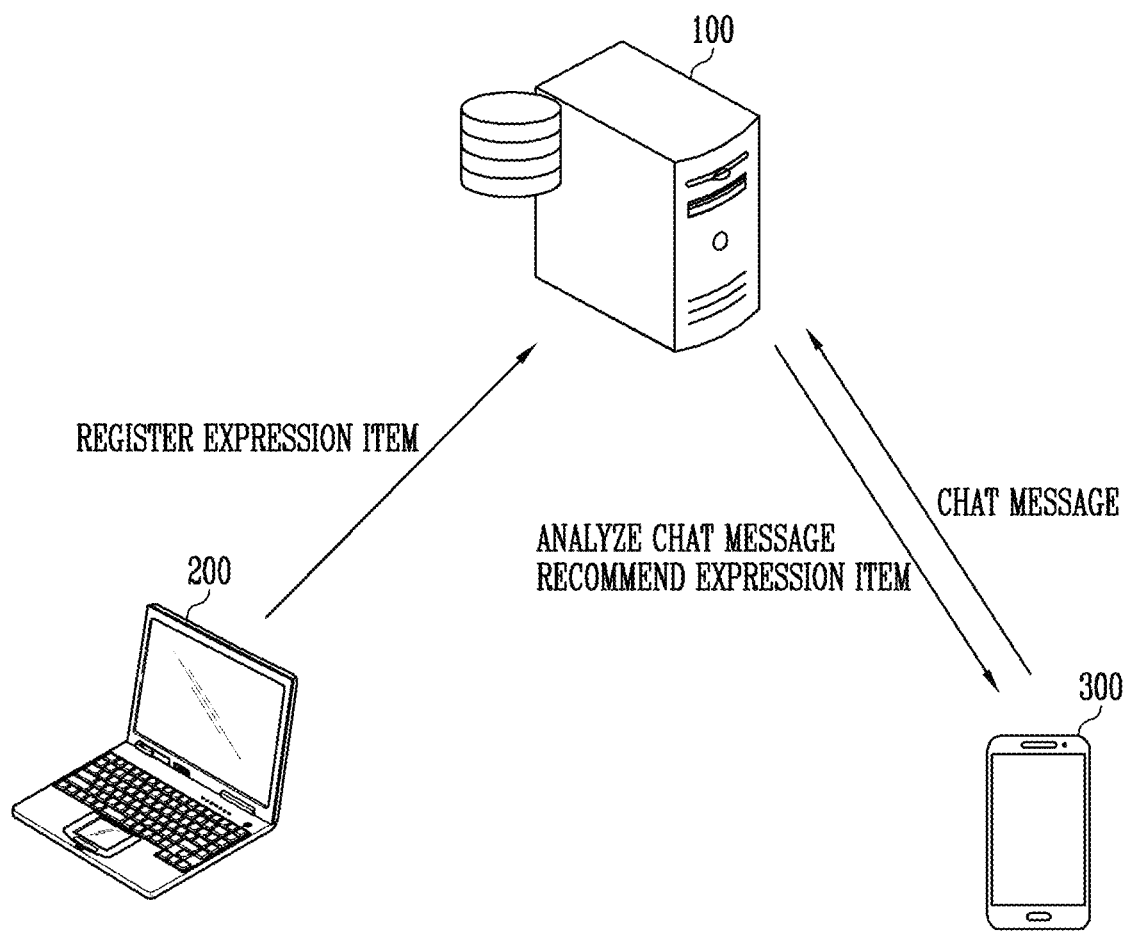
FIG. 1 is a diagram illustrating an environment in which a method and apparatus for providing a chat service including expression items are performed according to an embodiment.

The present disclosure may be embodied in many different forms and performed in various embodiments. Thus, certain embodiments are illustrated in the drawings and described in detail herein. However, it should be understood that the present disclosure is not limited to particular embodiments and includes all modifications, equivalents, and alternatives falling within the idea and scope of the present disclosure. In describing each drawing, similar reference numerals are used for similar elements.

Terms such as first, second, A, B, and the like may be used to describe various components but the components should not be limited by these terms. The terms are only used to distinguish one component from another. For example, a first component may be referred to as a second component without departing from the scope of the present disclosure, and similarly, a second component may also be referred to as a first component. The term "and/or" includes a combination of a plurality of related items described herein or any one of the plurality of related items.

When a component is referred to as being "coupled to" or "connected" to another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

The terms used herein are only used to describe certain embodiments and are not intended to limit the present disclosure. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as ideal or excessively formal meanings unless explicitly defined herein.

Hereinafter, embodiments of the present disclosure will be described in detail with reference to the accompanying drawings.

FIG. 1 is a diagram illustrating an environment in which a method and apparatus for providing a chat service including expression items are performed according to an embodiment.

Referring to FIG. 1, a chat service providing apparatus 100 is connected to an item registration terminal 200 and a user terminal 300 through a wired/wireless network and thus is capable of registering an expression item for a chat service and providing the user terminal 300 with a chat service including the registered expression item.

The wired/wireless network may be a network supporting code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix (CP)-OFDM technology, discrete Fourier transform-spread-OFDM (DFT-s-OFDM) technology, orthogonal frequency division multiple access (OFDMA) technology, single carrier (SC)-FDMA technology, non-orthogonal multiple access (NOMA) technology, generalized frequency division multiplexing (GFDM) technology, filter bank multi-carrier (FBMC) technology, universal filtered multi-carrier (UFMC) technology, space division multiple access (SDMA) technology, etc.

The item registration terminal 200 is capable of registering an expression item, which may be included in a chat message, in the chat service providing apparatus 100. For the registration, the item registration terminal 200 may transmit a subscription request message including information regarding a creator who created the expression item to the chat service providing apparatus 100 in advance, and receive a subscription approval message from the chat service providing apparatus 100. The item registration terminal 200 may be a terminal of a creator who created at least one expression item.

The chat service providing apparatus 100 may allocate an attribute to the expression item received from the item registration terminal 200 and store the expression item to which the attribute is allocated in a storage. In addition, the chat service providing apparatus 100 may receive a plurality of expression items from a plurality of item registration terminals 200 and store the plurality of expression items in the storage and register the stored expression items in a chat application running on the user terminal 300.

The user terminal 300 may be provided with a chat service from the chat service providing apparatus 100 when a chat application directly or indirectly distributed by the chat service providing apparatus 100 is installed and driven therein. For example, the user terminal 300 may be connected to an external cloud server, a distribution server operated by a third party, or the chat service providing apparatus 100 to download and install a chat application therein. An operation of the user terminal 300 described below may be understood as an operation of a chat application or an operation of a processor included in the user terminal 300 that drives the chat application.

As the chat application is driven, the user terminal 300 may display a chat interface on a display thereof and receive a chat message from a user. In this case, the user terminal 300 may receive user information of the user who uses the user terminal 300 in advance and transmit the received user information to the chat service providing apparatus 100. In addition, the user terminal 300 may display a plurality of expression items registered by the chat service providing apparatus 100 on a chat interface and create a chat message to include at least one expression item selected by the user. The user terminal 300 may transmit the created chat message to the chat service providing apparatus 100 and receive a chat message transmitted from a user terminal used by a counterpart through the chat service providing apparatus 100.

The chat service providing apparatus 100 may analyze chat messages received from the user terminal 300 to determine an intention of a user who created the chat messages, the context of the chat messages, and the like and determine an expression item matching the user's intention or the context of the chat messages. The chat service providing apparatus 100 may display the determined expression item on the chat interface of the user terminal 300 to recommend the expression item to the user of the user terminal 300. Direct or indirect content exchanged with a counterpart for communication of, for example, a person's emotion, action, thought, etc. may be collectively referred to as "intention".

A chat message may include text, an emoji, an image, a video, sound, voice, and the like. For example, a user of the user terminal 300 may input text through an input interface included in the user terminal 300 and attach image data, video data, sound data, voice data, etc. stored in the user terminal 300 to a chat message.

an expression item may include at least one of an emoji, text, voice, sound, a video, and an image that represent at least one of a person's emotion, action, and thought.

In one embodiment, an emoji, a video, an image, etc. may be referred to interchangeably as an emoticon or a sticker. An emoji is an image representing an emotion and standardized in unicode, and one emoji may correspond to one unicode.

The chat service providing apparatus 100 may allocate an attribute including at least one of a description, a reference emoji, a representative intention, and a representative language to an expression item. The representative intention may be at least one emotion, action, or thought represented by the expression item. The description is a textual expression of features of the expression item, e.g., a character name included in the expression item, a description of a suitable situation to which the expression item is applicable, a form of the expression item, and the content or format of text (date, time, animal name, person name, etc.) included in the form of an image in the expression item. The reference emoji is an emoji representing the representative intention represented by the expression item and may be an expression item in the form of an emoji registered in advance. The representative language may be a language corresponding to text, an image, sound, voice, etc. included in the expression item. For example, when the expression item is an image and a phrase "hello" is included as a part of the image, the expression item may be allocated with English as an attribute.

Attributes of the expression item may further include the number of times the expression item is used by each user, a registration date of the expression item, a data type, regions in which the expression item can be used, a version, whether the expression item was produced by a third party, and the like.

Various attributes allocated to the expression item may function as similar words, substitutes, or synonyms representing the expression item and thus the expression item to which the attributes are assigned is a thesaurus and may be used for natural language processing (NLP).

The chat service providing apparatus 100 may be embodied as a server capable of supporting various types of communication protocols, performing encryption and decryption of chat messages, transmitting a chat message to or receiving a chat message from the user terminal 300 through an encrypted secure channel, and transmitting a push message to the user terminal 300.

The item registration terminal 200 or the user terminal 300 may be, for example, a desktop computer, a laptop computer, a notebook computer, a smart phone, a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), or the like.

At least some of operations performed by the chat service providing apparatus 100 may be also performed by the user terminal 300. For example, the user terminal 300 may analyze a chat message, determine an intention of a user who created the chat message, a context of the chat message, etc., and determine an expression item matching the user's intention or the context of the chat message. The chat service providing apparatus 100 may display the determined expression item on the chat interface of the user terminal 300 to recommend the expression item to the user of the user terminal 300.

FIG. 2 is a diagram illustrating a registration interface for registering an expression item in the chat service providing apparatus 100 by the item registration terminal 200 of FIG. 1.

Referring to FIG. 2, when the item registration terminal 200 is connected to the chat service providing apparatus 100, the chat service providing apparatus 100 may provide the item registration terminal 200 with a registration interface (RI) for registering an expression item.

For example, the item registration terminal 200 may transmit, to the chat service providing apparatus 100, a name, description, tag, etc. of an expression item to be registered through the registration interface RI.

The registration interface RI may include a first sub-interface SI_1 for receiving an emoji corresponding to the expression item to be registered. A plurality of emojis to which attributes are allocated in advance may be displayed on the first sub-interface SI_1, and the item registration terminal 200 may select at least one emoji similar to an emotion, an action, thought, etc. represented by the expression item to be registered from among the plurality of emojiis displayed on the first sub-interface SI_1 (through a user input). The item registration terminal 200 may transmit the selected at least one emoji to the chat service providing apparatus 100. Here, the plurality of displayed emojis may be expression items registered in advance.

The chat service providing apparatus 100 may determine a representative intention corresponding to the selected at least one emoji on the basis of an attribute allocated to the selected at least one emoji, and transmit the determined representative intention to the item registration terminal 200.

The item registration terminal 200 may display the representative intention to the user along with the selected at least one emoji. To this end, the registration interface RI may further include a second sub-interface SI_2 for displaying at least one emoji selected by the item registration terminal 200 and a representative intention related to the at least one emoji. In this case, the at least one emoji displayed on the second sub-interface SI_2 may be displayed to correspond to an order selected by the item registration terminal 200.

The registration interface RI may further include a third sub-interface SI_3 for receiving a language corresponding to an expression item to be registered. The item registration terminal 200 may select at least one language from among a plurality of languages displayed on the third sub-interface SI_3 and transmit the selected language to the chat service providing apparatus 100.

Although not shown in the drawings, the registration interface (RI) may further include a sub-interface to which a file of an expression item to be registered is to be attached, and the file of the expression item attached to the sub-interface may be transmitted to the chat service providing apparatus 100.

Figure 14:
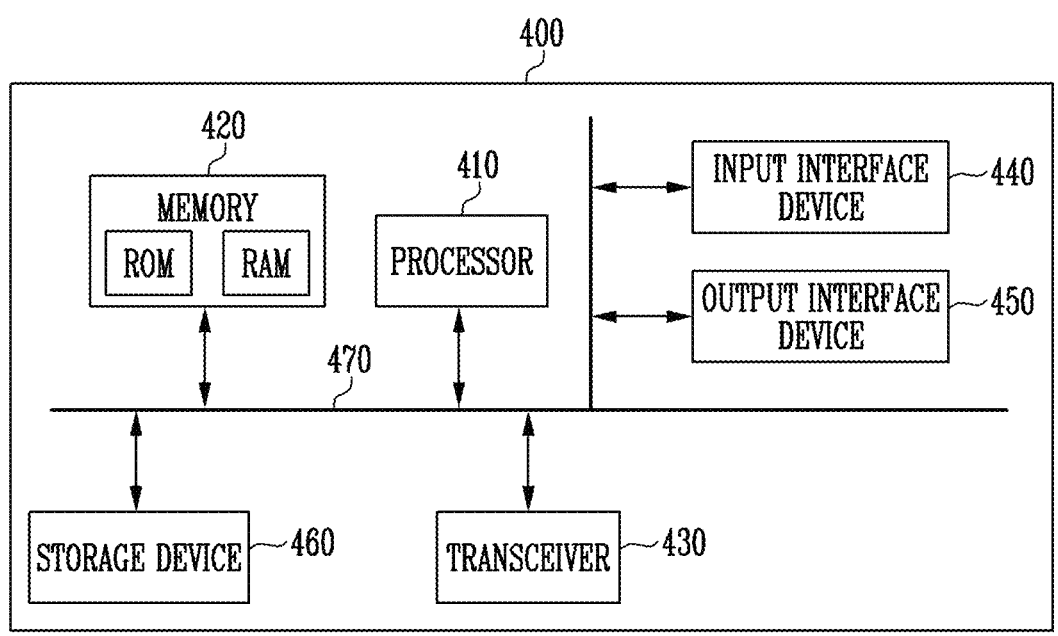
FIG. 14 is a diagram illustrating a hardware configuration of the chat service providing apparatus of FIG. 1.

The chat service providing apparatus 100 may allocate an attribute to an expression item provided through the registration interface (RI) from the item registration terminal 200 and store the expression item to which the attribute is allocated in a storage device 460 of FIG. 14. For example, the item registration terminal 200 may determine at least one emoji selected through the first sub-interface SI_1 as a reference emoji corresponding to an expression item to be registered and determine a language input through the third sub-interface SI_3 as a representative language corresponding to the expression item to be registered.

In addition, other undetermined attributes of the expression item to be registered may be allocated through an input from an administrator or may be automatically allocated by a machine learning algorithm based on feedback information obtained as the expression item is included and used in a chat message.

Figure 3:
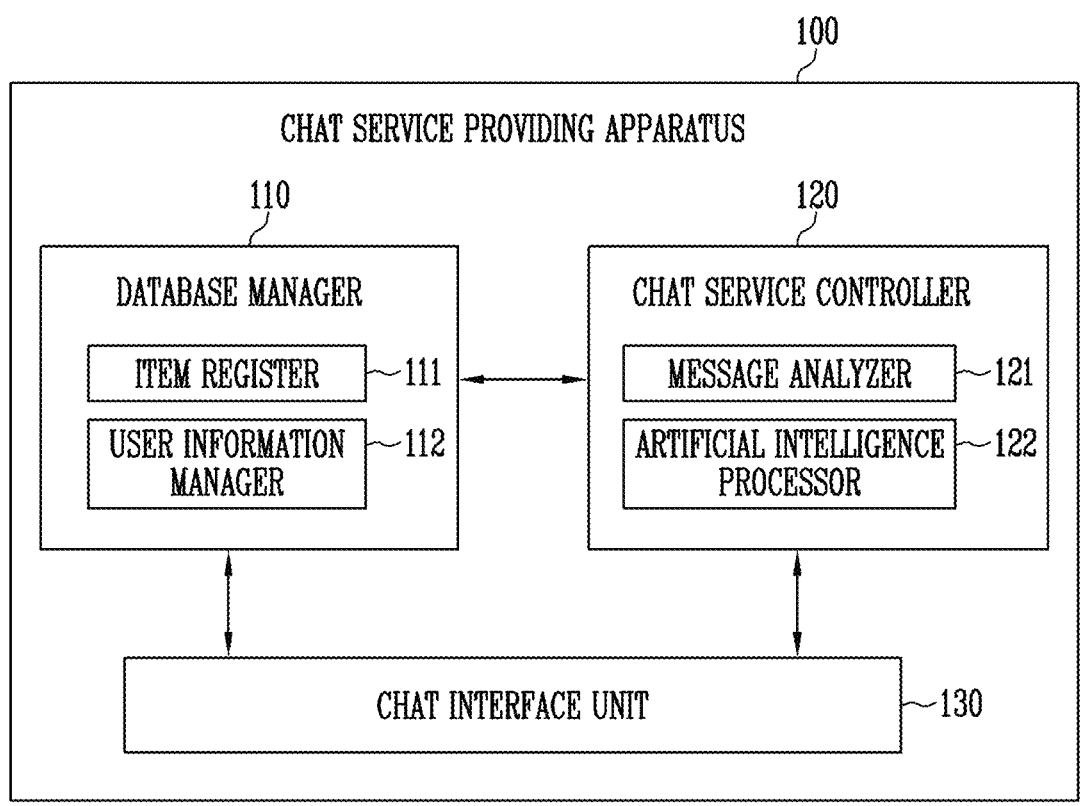
FIG. 3 is a diagram illustrating functional components of the chat service providing apparatus of FIG. 1.

FIG. 3 is a diagram illustrating functional components of the chat service providing apparatus 100 of FIG. 1.

Referring to FIG. 3, the chat service providing apparatus 100 may include a database manager 110, a chat service controller 120, and a chat interface unit 130.

The database manager 110 may manage data information obtained from the item registration terminal 200 and the user terminal 300.

The database manager 110 may include an item register 111 and a user information manager 112.

The item register 111 may allocate an attribute to expression items provided from a plurality of item registration terminals 200, store the expression items to which the attribute is allocated in the storage device 460 described in FIG. 14, and register the expression items stored in the storage device 460 in a chat application to be driven in the user terminal 300.

The user information manager 112 may receive user information from a plurality of user terminals 300 and store the received user information in the storage device 460. Here, the user information may include a status message recorded by a user on a status window of a chat interface, a profile image set by the user as a profile of the chat interface, a background image set by the user as a background of the chat interface, the user's feedback information regarding an expression item recommended by the chat service providing apparatus 100, and the like. For example, the feedback information may include whether the recommended expression item was used by the user, the number of times the recommended expression item was used, and the like.

User information and expression items stored in the storage device 460 by the user information manager 112 and the item register 111 may be continuously accumulated and used to provide a chat service. For example, the user information may be used as a piece of input data for processing a chat message for the message analyzer 121. Specifically, the feedback information included in the user information may be used for fine-tuning neural network parameters included in the message analyzer 121. In addition, the message analyzer 121 may determine a user's intention on the basis of the profile image, the background image, the status message, and the like included in the user information. For example, the profile image and the background image may be input to the image processor 121*b* of the message analyzer 121, and the status message may be input to a natural language processor 121*a* of the message analyzer 121.

The chat interface unit 130 may generate a chat interface for inputting a chat message to or displaying a chat message on the user terminal 300 and providing the chat interface to the user terminal 300. The chat interface may further include an interface for displaying a user's profile image, an interface for displaying the user's status message, and the like, as well as an interface for inputting and displaying a chat message. In addition, the chat interface may further include an interface for displaying a plurality of registered expression items in advance, an interface for displaying expression items recommended by the chat service providing apparatus 100, and the like.

The chat service controller 120 may analyze at least one chat message received from the user terminal 300 and determine a user's intention corresponding to the chat message, a context of the chat message, and the like. The chat service controller 120 may provide a recommended expression item to the user on the basis of the determined user's intention or the context of the chat message.

The chat service controller 120 may include the message analyzer 121 and an artificial intelligence processor 122.

The message analyzer 121 may identify an expression item included in a chat message and determine a user's intention or the context of the chat message on the basis of an attribute allocated to the identified expression item. The expression item may include text, an image, a video, sound, voice, and the like. The expression item is not limited to the present embodiment and may include various means for representing a user's intention.

The artificial intelligence processor 122 may determine an expression item to be recommended to a user on the basis of a user's intention or context of a chat message identified by the message analyzer 121.

For example, the artificial intelligence processor 122 may determine a reference emoji matching, as an attribute, a representative intention corresponding to the user's intention or the context of the chat message identified by the message analyzer 121. The artificial intelligence processor 122 may recommend at least one expression item corresponding to the determined reference emoji to the user.

The artificial intelligence processor 122 may support processing various types of expression items by converting between expression items using attributes allocated to the expression items as parameters.

Figure 4:
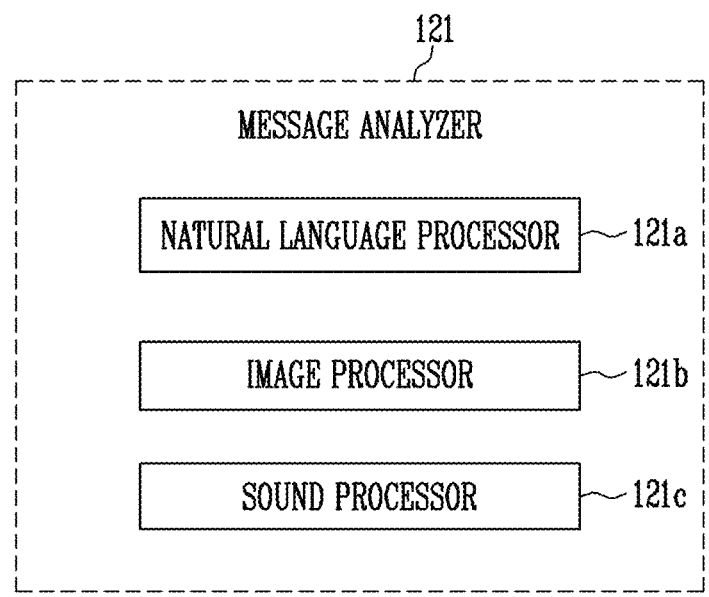
FIG. 4 is a diagram for describing a configuration of a message analyzer of FIG. 3.

FIG. 4 is a diagram for describing a configuration of the message analyzer 121 of FIG. 3.

The message analyzer 121 may include the natural language processor 121*a*, the image processor 121*b*, and a sound processor 121*c*.

The natural language processor 121*a* may identify text, emojis, and the like included in a chat message, and perform natural language processing on at least one sentence generated from a combination of the identified text and emojis. The natural language processor 121*a* may determine the context of the chat message and/or a user's intention on the basis of a result of performing the natural language processing. For example, the natural language processor 121*a* may be embodied using a framework or algorithm for implementing natural language processing, such as Python NLTK, Sanford CoreNLP, Apache OpenNLP, Microsoft's Turing, BERT, GPT-2, or the like.

The image processor 121*b* may identify an image and a video included in the chat message and determine the user's intention matching the identified image or video. For example, the image processor 121*b* may identify objects in an image included in the chat message using an object identification algorithm based on a Convolutional Neural Network (CNN) or a Recurrent Neural Network (RNN). The image processor 121*b* may determine an expression item having an attribute (e.g., a description) corresponding to identified objects and determine the user's intention on the basis of a representative intention of the determined expression item. The object identification algorithm may include the Single Shot Detector (SSD) algorithm (reference: W. Liu, et al, SSD: Single Shot MultiBox Detector, 2016, ECCV) and/or the YOLO (You Only Look Once) algorithm (reference: Redmon, J., Divvala, S., Girshick, R., & Farhadi, A. (2016). You Only Look Once: Unified, Real-Time Object Detection. In Proceedings of the IEEE Conference on Computer Vision and Pattern Recognition pp. 779-788).

However, the object identification algorithm is only an example, and the image processor 121*b* may be embodied as a neural network capable of performing object identification, supervising and learning a user's intention (e.g., the user's emotion, action, or thought) corresponding to a training image, and outputting the user's intention corresponding to an input image. In this case, the neural network may include an input layer, a hidden layer, and an output layer and may be tuned by inputting a training image to the input layer, calculating a difference value between a user's intention output from the output layer and the user's actual intention corresponding to the training image through a loss function, and determining parameters of the hidden layer to minimize a resulting value of the calculated loss function.

The sound processor 121*c* may identify sound or voice included in a chat message and determine a user's intention corresponding to the identified sound or voice.

For example, the sound processor 121*c* may identify sound or voice included in a chat message, convert the identified sound or voice into text, and provide the text to the natural language processor 121*a* or may directly determine a user's intention corresponding to the sound or voice by analyzing the sound or the voice with respect to a frequency domain or a time domain.

Figure 5:
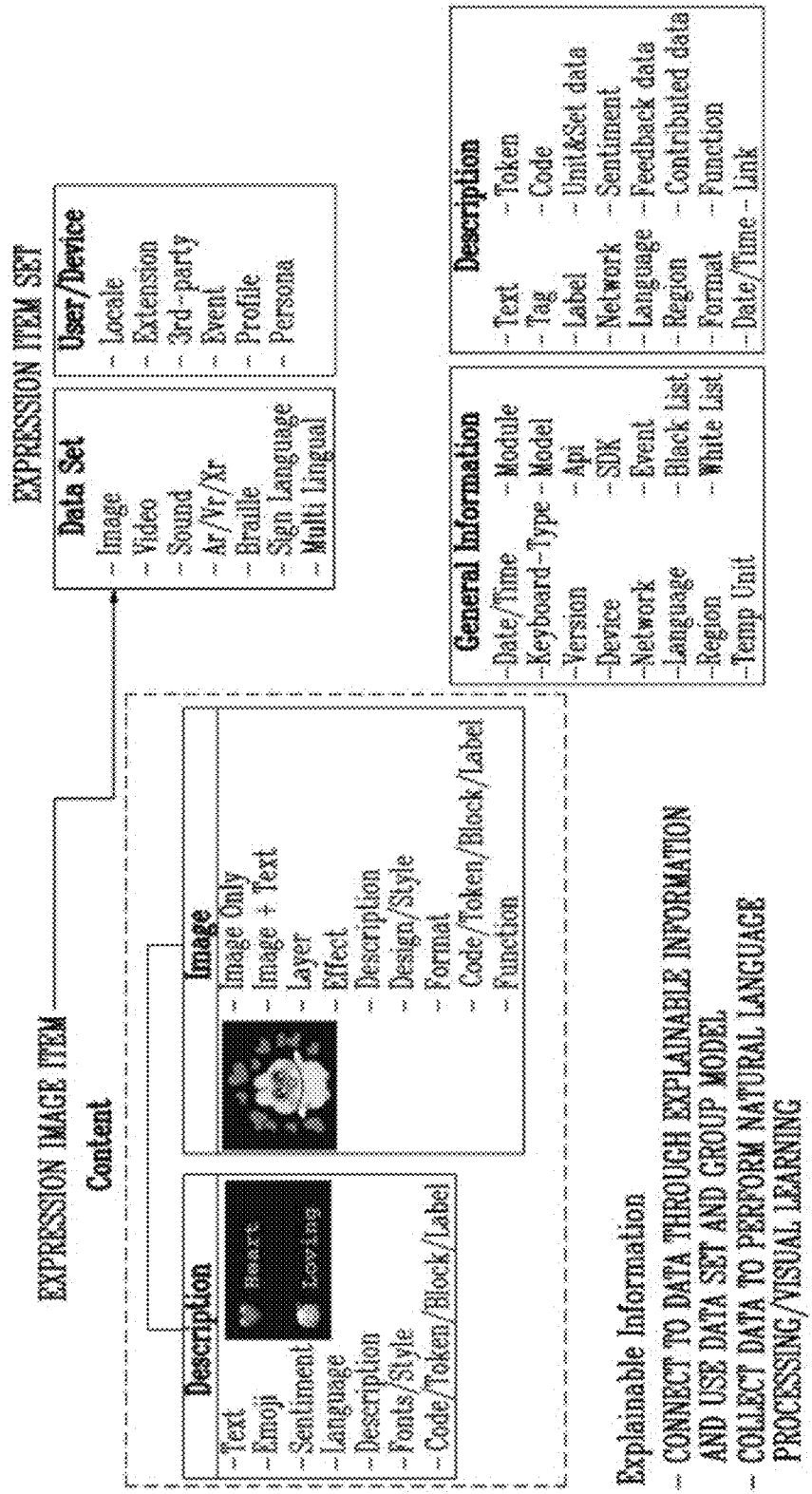
FIG. 5 is a diagram for describing an expression item according to an embodiment.

FIG. 5 is a diagram for describing an expression item according to an embodiment.

Referring to FIG. 5, an expression item may be classified as a text item or an image item. A type of the expression item is not limited to the present embodiment.

A data set may indicate a type of expression item. User/device information may include information regarding a user using an expression item and information regarding a device to be used.

FIG. 5 illustrates a connection relationship between an image and a description. For example, a character surrounded by hearts may be recognized as an expression image item and an expression item associated therewith may be matched. When the matched expression item is selected, general information and a description of the recognized expression item may be used. The matched expression item may be an expression item to be recommended.

The matched expression item may be a combination of text and an emoji. The matched expression item may include text such as "heart" and "loving" and emojis corresponding thereto. A format of the matched expression item is not limited to the present embodiment.

Based on an analysis medium described with reference to FIG. 6 below, the type of an input expression item may be classified, and an expression item to be recommended may be determined through natural language processing learning and visual learning.

FIG. 6 is a diagram illustrating an analysis medium for classifying expression items according to an embodiment.

Referring to FIG. 6, emoji unicode is available within a range of all media. The reason why an emoji among data is used to tag information of a set of expression items or used as additional information is because representation of emotions and states, such as expressions, situations, costumes, etc., which are listed according to expression item categories are standardized. Matching of various emotions and intentions may be done more easily on the basis of unicoded text-readable information using emojis. Each set of expression items may include a description, emojis, and emotion values.

Referring to FIG. 6, in the analysis medium, a description and text may be classified. Text may represent standard characters, a name, a form of a language (words), etc. to be defined. A description may indicate unexplained text or text to which no style is applied. The description may be changed in the form of a title, name, or word when a range of information of text is reduced or confused.

An extensible emoji may be a participatory emoji in a form extended from an existing emoji field. Sound may be classified into and include rhythm, melody, music, audio, and sound wave information. An image may be classified as and include an emoji, a sticker, a dynamic image design, animation, or frame information. Video may include a sound item and be classified as and include flick or frame information.

The description may represent and include various descriptions and behavior information such as text, tags, tokens, labels, and blocks. Data may be easily updated in the description.

An emotion may be a piece of expression environment data and include emotion data, a situation, etc.

A language may be in a form of a relational language, such as a high-level language, a related language, and a low-level language so that a multilingual information configuration, languages of the world such as English, derived dialect data, etc. may be additionally learned. General information may represent or include device information, area information, and various types of general information to be checked.

In the analysis medium, the description may be organically updated, e.g., modified or added.

Figure 7:
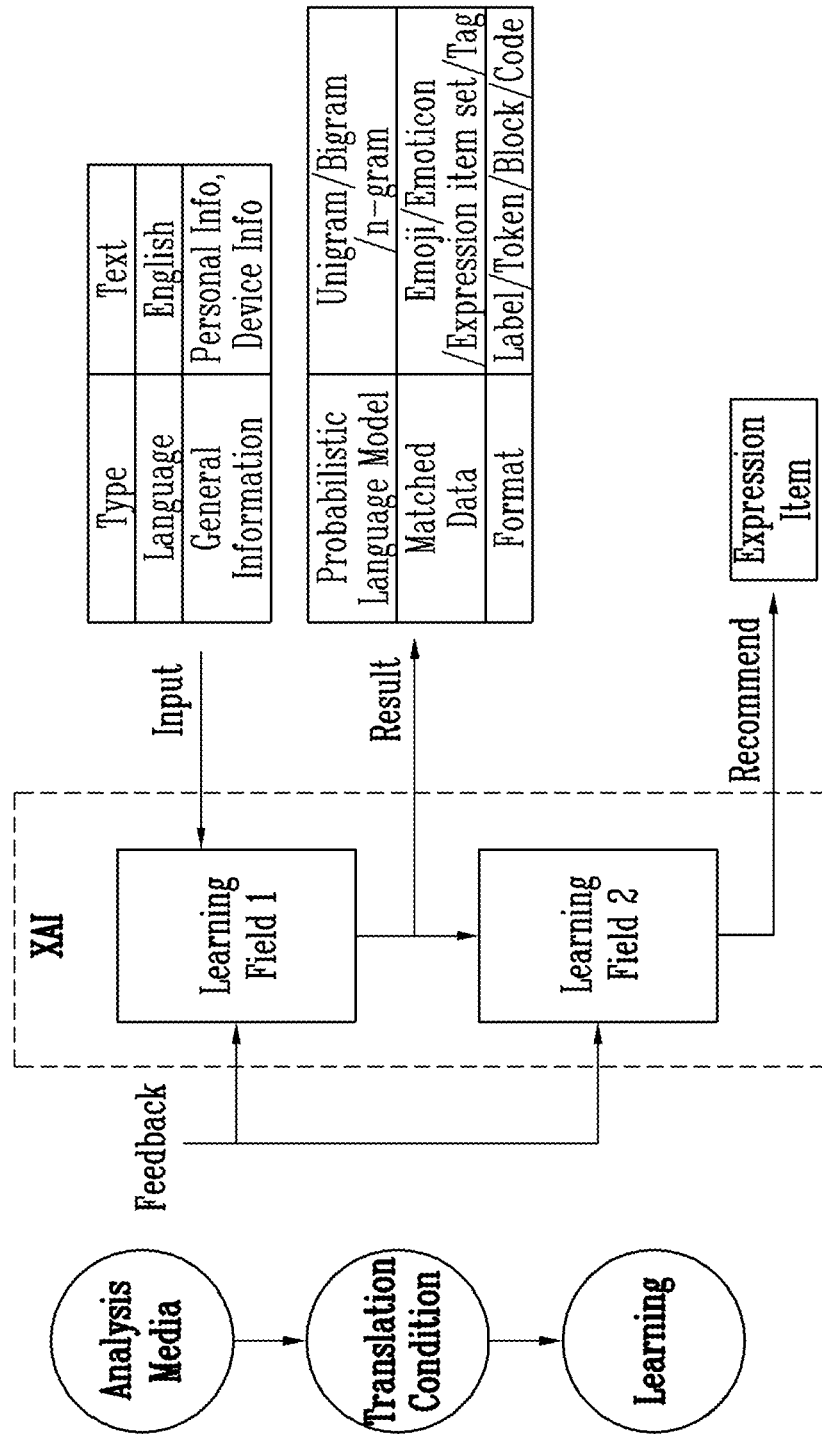
FIG. 7 is a diagram for describing an operation of a chat service controller of FIG. 3.

FIG. 7 is a diagram for describing an operation of a chat service controller 121 of FIG. 3.

Referring to FIG. 7, the chat service controller 120 may analyze an input chat message in the form of an analysis medium. The chat service controller 120 may generate a contents thesaurus through analysis media which may be converted therebetween. A thesaurus set corresponding to synonyms or similar words may be composed of text, voice, sound, images, videos, braille, sign language, XR, multilingual, code, and the like. The thesaurus set has various properties in the same description and may be easily updated through a data generation function and easily learned through feedback, scoring, rating, or the like.

The thesaurus set may consist of a combination of emojis, a description, and emotions for precise meaning and expression. This configuration is intended to more accurately interpret, set, and deliver communication expression environments such as emotions, situations, and costumes.

In FIG. 7, the chat service controller may analyze an input chat message in the form of an analysis medium. The chat service controller may determine an expression item to be recommended to a user according to a conversion condition on the basis of analyzed input data (conversation analysis, user analysis, and other analysis data). The chat service controller may be trained with a conversion condition through a description of input data analyzed in the form of an analysis medium or visual data (images or videos).

The chat service controller may determine a user's intention that is the same as or most similar to an attribute of the analyzed input data. The chat service controller may recommend an expression item corresponding to the user's intention according to the conversion condition from among expression items registered in advance.

The conversion condition may be an algorithm for selecting an expression item most matching the user's intention from among the expression items registered in advance. For example, according to the conversion condition, an expression item interpreted as having the same meaning, the same emotion, or the same expression environment as an attribute of the analyzed input data may have a priority value. According to the conversion condition, a value with a short straight-line distance, a significant value, a high-level word (high-level meaning), a low-level word (low-level meaning), an opposite word (inverse meaning), a related word, etc. excluding priority values may be interpreted as suboptimal values. In the conversion condition, a cross-reference pattern may be used and the strength of a meaning may be measured through a combination of emotions.

The chat service controller may include Explainable/Interpretability Artificial Intelligence (XAI). XAI may include a plurality of learning fields. A first learning field may output a result of analyzing an input chat message in the form of an analysis medium. The first learning field may train a method of analyzing an input message in the form of an analysis medium on the basis of previously input data. The first learning field may update an analysis method through external feedback information and internal feedback information. The external feedback information may include the user's feedback information described above with reference to FIG. 3. The internal feedback information may include previously collected analysis results.

A second learning field may output an expression item to be recommended according to the conversion condition on the basis of an input analysis result. The second learning field may train the conversion condition on the basis of previously input data. The second learning field may update an analysis method through the external feedback information and the internal feedback information. The external feedback information may include a user's feedback information. The internal feedback information may include previously collected conversion results.

In an embodiment, the message analyzer 121 of FIG. 3 may include the first learning field, and the artificial intelligence processor 122 may include a second learning field.

Figure 8:
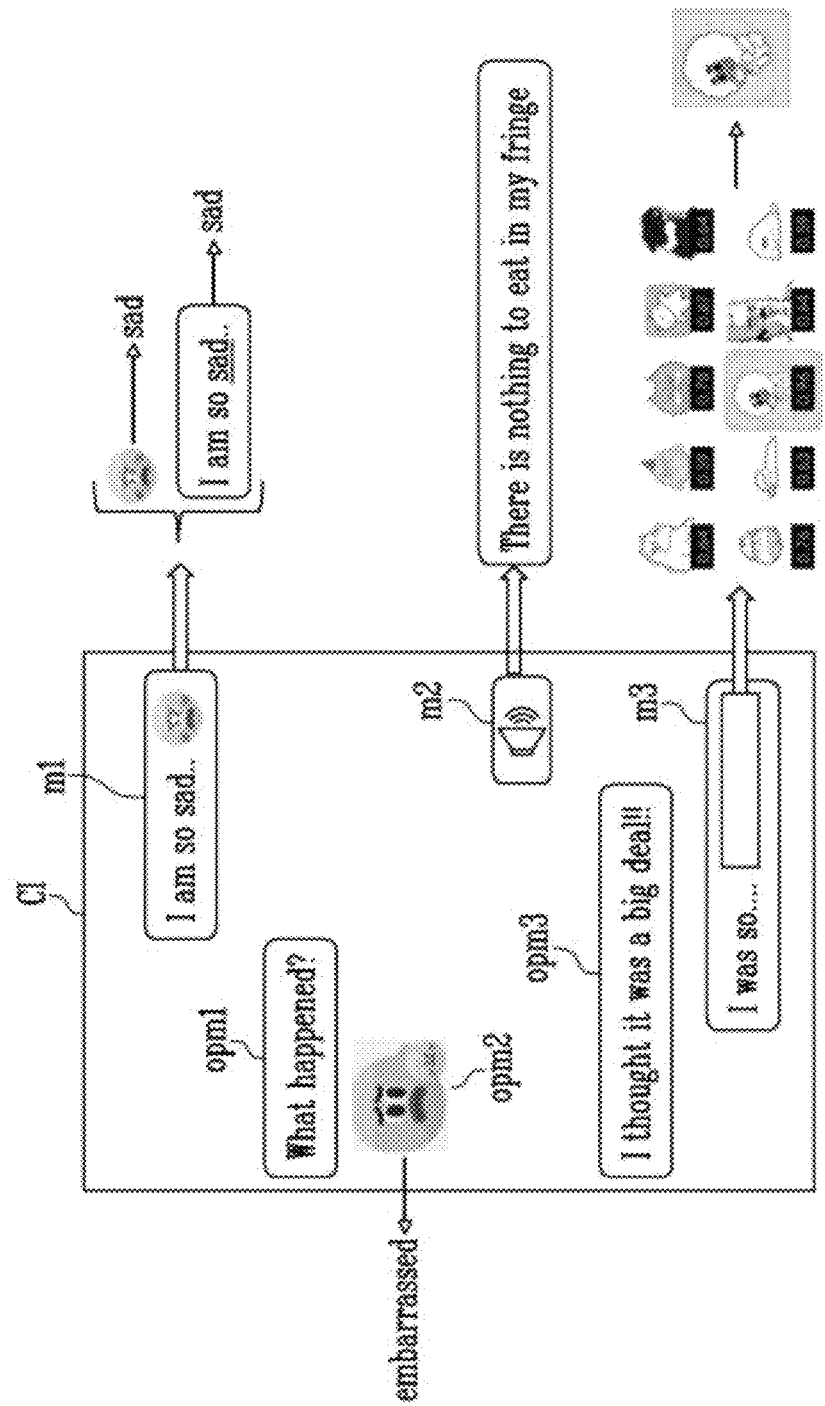
FIGS. 8 and 9 are diagrams for describing operations of a message analyzer and an artificial intelligence processor of FIG. 3.
Figure 9:
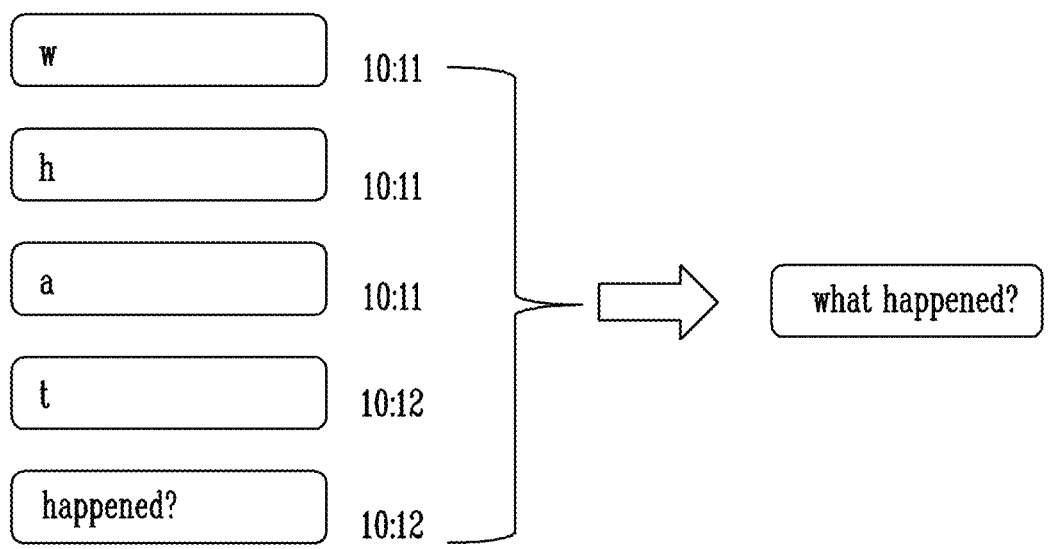

FIGS. 8 and 9 are diagrams for describing operations of the message analyzer 121 and the artificial intelligence processor 122 of FIG. 3.

Referring to FIG. 8, a chat application running in the user terminal 300 may display a chat interface (CI) on a display. In this case, a user of the user terminal 300 may transmit a plurality of chat messages m1, m2, and m3 to the chat service providing apparatus 100 through the chat interface (CI).

The message analyzer 121 may determine the user's intention by analyzing the chat messages m1, m2, and m3 provided from the user.

Specifically, referring to FIG. 4, the natural language processor 121a included in the message analyzer 121 may determine the user's intention (here, the user's emotion) corresponding to an expression item included in the first chat message m1 to be "sad" on the basis of an attribute (or reference intention) of the expression item.

In addition, the natural language processor 121a may process a sentence (I am so sad . . . ) included in the first chat message m1 in a natural language, and determine the user's intention (or the user's feeling) corresponding to the sentence (I am so sad . . . ) to be "sad". For example, the natural language processor 121a may determine the user's intention (or the user's feeling) corresponding to the sentence (I am so sad . . . ) by performing a morpheme analysis for performing a meaning analysis using "morphemes" which are minimum semantic units with respect to the sentence (I am so sad . . . ) included in the first chat message m1, a syntax analysis for performing a meaning analysis by decomposing the sentence (I am so sad . . . ) into meaningful tokens and parsing the meaningful tokens, or the like.

In this case, the user's intention, which is an output from the natural language processor 121a with respect to the first chat message m1, may have a specific probability or a scored value. Accordingly, the natural language processor 121a may determine, as the user's intention in the first chat message m1, the user's intention corresponding to a highest probability among a plurality of probabilities output with respect to the first chat message m1 or the user's intention corresponding to a value equal to or greater than a threshold value among scored values.

The sound processor 121c included in the message analyzer 121 may sense sound included in the second chat message m2 and output text corresponding to the sensed sound so as to convert the sound into text, and the natural language processor 121a may perform the morpheme analysis or the syntax analysis on the second chat message m2 converted to the text so as to determine the user's intention with respect to the second chat message m2.

In another embodiment, the sound processor 121c may determine the user's intention corresponding to sound by analyzing the sound or the voice with respect to a frequency domain or a time domain included in the second chat message m2.

Here, the user's intention determined for each chat message may be expressed in a color of a window displaying a chat message or may be quantified with an intensity value indicating the intensity of the intention and expressed in a color corresponding to the intensity value.

The message analyzer 121 may not only determine the user's intention with respect to the chat messages m1 and m2 received from the user terminal 300 of a user who is chatting but also determine an intention of the user who will transmit the third chat message m3 by taking into account chat messages opm1 to opm3 received from a user terminal of a counterpart user.

For example, the user's intentions respectively corresponding to the first and second chat messages m1 and m2 and the first to third chat messages opm1 to opm3 from the counterpart user may be determined, and the intention of the user who will transmit the third chat message m3 may be determined on the basis of the determined user's intentions.

In addition, the message analyzer 121 may not only determine the user's intention for each chat message but also combine all chat messages within a preset time interval and determine the user's intention with respect to a combination of the chat messages.

For example, referring to FIG. 9, a case in which a plurality of texts are output within a time interval of one second or less is illustrated. As such, when a user intentionally divides and inputs text ("what") in a plurality of chat messages, it may be difficult to grasp the user's intention. In order to solve this problem, the natural language processor 121a may determine the user's intention corresponding to a plurality of chat messages by sequentially combining sentences (or texts) included in chat messages within a preset time interval and perform natural language processing with respect to determined sentences ("what happened?").

In FIG. 8, the message analyzer 121 may determine a user's intentions with respect to the chat messages m1 and m2 received from the user terminal 300 within a time interval in which conversation continuity is recognized.

The artificial intelligence processor 122 may receive information regarding the user's intention determined by the message analyzer 121 by analyzing the chat messages m1 and m2 provided from the user. The artificial intelligence processor 122 may determine an expression item to be recommended to the user terminal 300 on the basis of the user intention determined by the message analyzer 121.

The artificial intelligence processor 122 may determine expression items corresponding to results of digitizing the determined user intentions (0.64, 0.59, 0.78, . . . , 0.59) and determine the determined expression items or an expression item with a highest digitized result among the determined expression items to be recommended to the user. Here, the time interval in which conversation continuity is recognized may be a time interval (e.g., one minute to 30 minutes) preset relative to a current time point. Therefore, when time intervals between the first chat message m1, the second chat message m2 and the third chat message m3 are less than or equal to a preset time interval, an expression item to be recommended to the user terminal 300 may be determined and displayed on the user terminal 300 at a time point when the third chat message m3 is input by the user on the basis of the user's intention determined with respect to the first and second chat messages m1 and m2.

Figure 10:
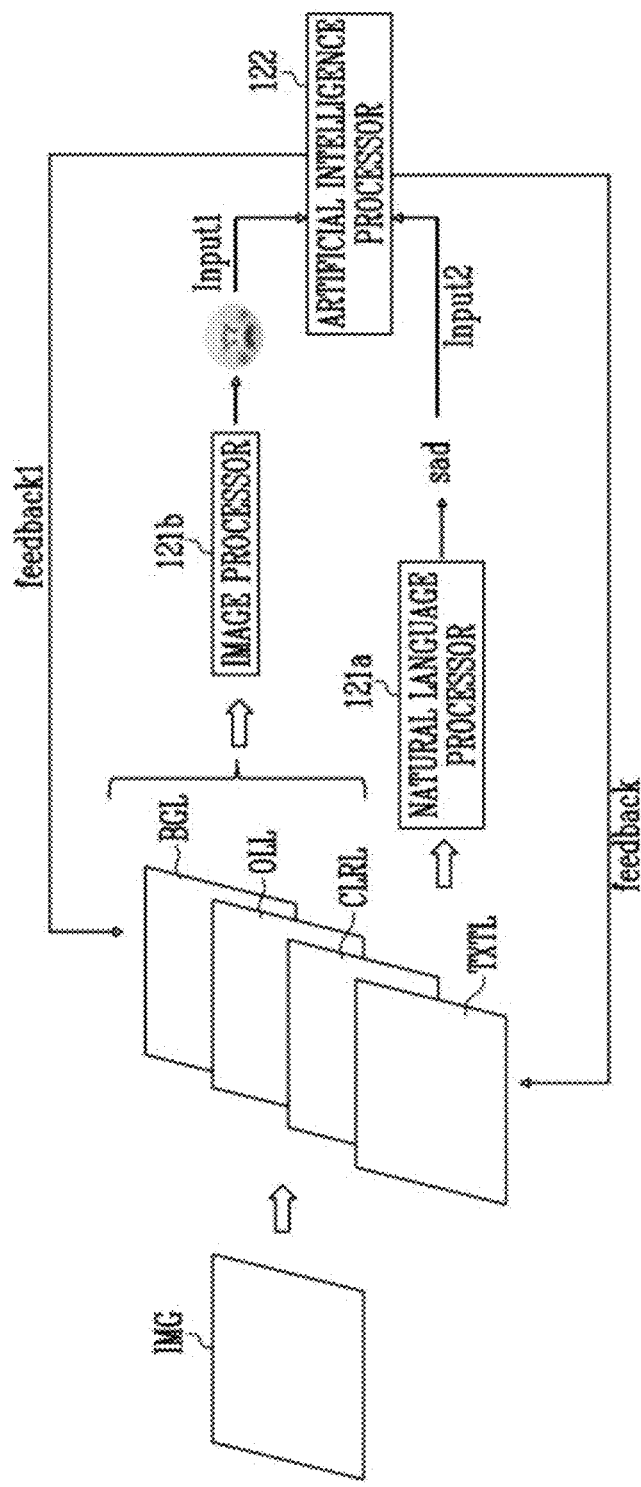
FIG. 10 is a diagram illustrating a process of processing a video or image by the message analyzer and the artificial intelligence processor of FIG. 3.

FIG. 10 is a diagram illustrating a process of processing a video or image by the message analyzer 121 and the artificial intelligence processor 122 of FIG. 3.

Referring to FIG. 10, the message analyzer 121 may determine a user's intention by analyzing a video or image included in a chat message. The artificial intelligence processor 122 of FIG. 3 may transform the analyzed video or image on the basis of the determined user's intention.

Referring to FIG. 4, for example, the image processor 121b included in the message analyzer 121 may extract a key frame from among image frames constituting a video included in a chat message and determine a user's intention on the basis of the extracted key frame.

The artificial intelligence processor 122 may transform the key frame on the basis of the determined user's intention. For example, the key frame may be a temporarily-following image frame among two consecutive image frames among the image frames when a motion change between the two consecutive image frames is greater than or equal to a threshold. In this case, the motion change may be determined on the basis of motion vectors calculated between adjacent image frames among the image frames. A method of calculating motion vectors is defined in detail in an image standard according to MPEG4 or H.264 and will be easily understood by those of ordinary skilled in the art, and thus, a detailed description thereof will be omitted. A process of determining a user's intention with respect to an image included in a chat message and performing feedback processing according to the determined user's intention will be described below. Here, the image should be understood as a key frame.

Referring to FIG. 10, the message analyzer 121 may preprocess an image IMG included in a chat message to divide the image IMG into a plurality of layers. For example, the message analyzer 121 may extract a background included in the image IMG to create a background layer BGL, extract outlines of objects included in the image IMG to create an outline layer OLL, extract at least one of colors of the image IMG to create a color layer CLRL, and extract text included in the image IMG to create a text layer TXTL. Next, the background layer BGL and the outline layer OOL may be input to the image processor 121b.

The image processor 121b may identify at least one object with respect to the background included in the background layer BGL and objects included in the outline layer OOL using an object recognition algorithm, and determine an expression item having an attribute corresponding to the identified at least one object. For example, the image processor 121b may identify a certain character among objects included in the outline layer OOL and determine an expression item to which a name of the character is allocated as an attribute (e.g., a description). The image processor 121b may determine a user's intention on the basis of the description of the determined expression item, a reference intention, a reference emoji, etc. For example, when the expression item determined by the image processor 121b includes a reference emoji corresponding to "sad", the image processor 121b may determine the user's intention as "sad".

When the user's intention is determined by the image processor 121b, the artificial intelligence processor 122 may convert the image IMG using (or receiving feedback on) the determined user's intention. For example, the artificial intelligence processor 122 may replace the color of the color layer CLRL with a color set in advance to correspond to "sad" determined as the user's intention. As another example, the artificial intelligence processor 122 may determine an expression item in a text format corresponding to "sad" among registered expression items and replace the text layer TXTL with the determined expression item. As another example, the artificial intelligence processor 122 may select an image type expression item having attributes (reference intention, reference emoji, description or the like) corresponding to the user's intention from among the registered expression items and replace an object (or character) included in the outline layer OLL with an object (or character) included in the selected expression item.

The natural language processor 121a included in the message analyzer 121 may receive text included in the text layer TXTL. The natural language processor 121a may determine the user's intention using the text included in the text layer TXTL. In addition, when the user's intention determined by the natural language processor 121a is "sad", the artificial intelligence processor 122 may select an expression item in a text form corresponding to "sad" from among the registered expression items and replace the text layer TXTL with the selected expression item.

The artificial intelligence processor 122 may determine a context or format corresponding to text included in the text layer TXTL. For example, when text included in the text layer TXTL is text representing a certain time, the artificial intelligence processor 122 may determine a format corresponding to the text included in the text layer TXTL as "time". The artificial intelligence processor 122 may determine alternative text corresponding to the determined context or format and replace the text included in the text layer TXTL with the determined alternative text. For example, the artificial intelligence processor 122 may replace "time" included in the text layer TXTL with "current time".

When the image IMG is a registered expression item, the artificial intelligence processor 122 may translate the image IMG on the basis of an attribute of the expression item without performing object recognition or natural language processing by the image processor 121b or the natural language processor 121a. For example, when the description indicates that the text included in the image IMG is a current time among attributes allocated to the image IMG, the artificial intelligence processor 122 may replace the text included in the text layer TXTL with "current time" on the basis of the description corresponding to the image IMG.

Figure 11:
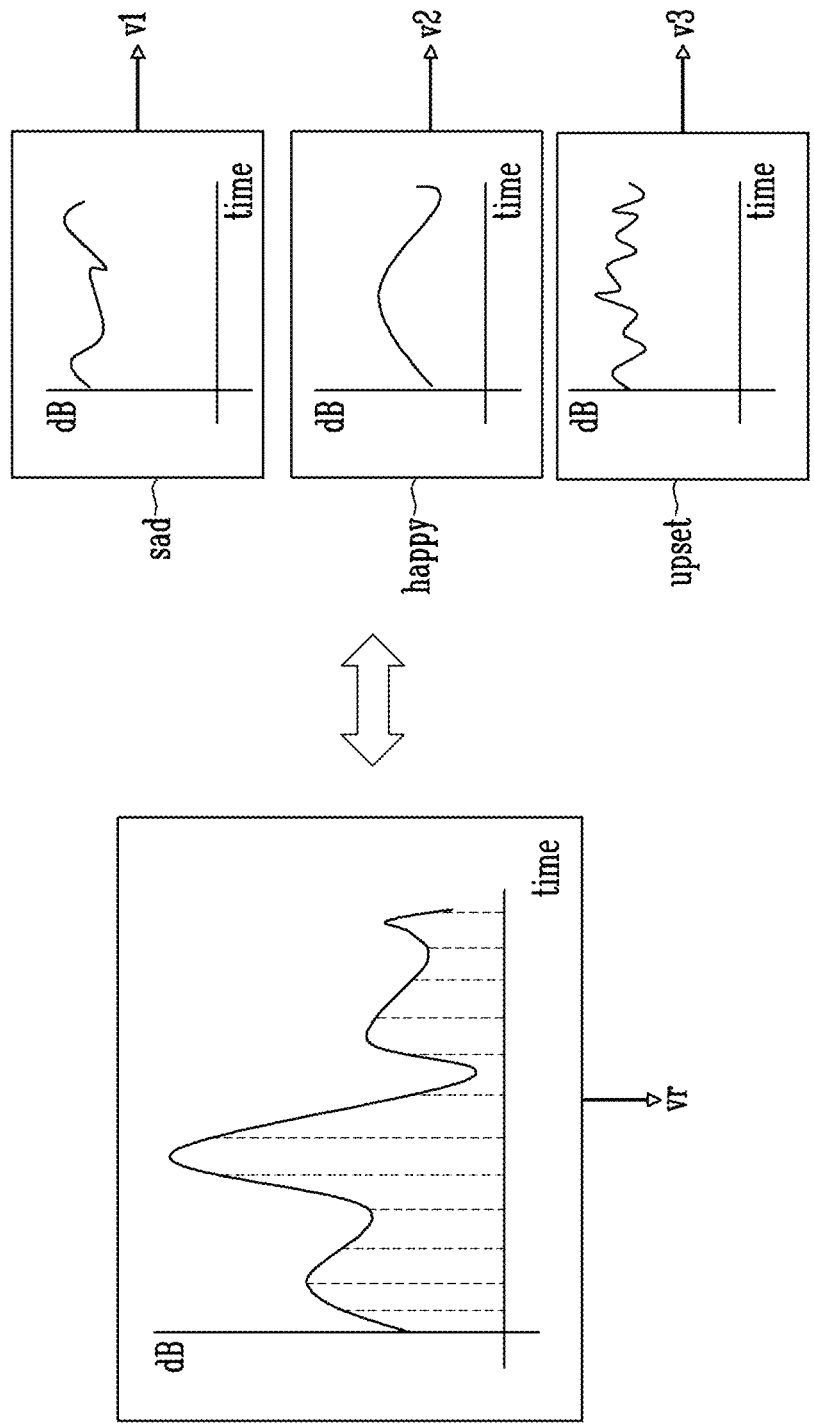
FIG. 11 is a diagram illustrating a process of processing sound or voice by the message analyzer of FIG. 3.

FIG. 11 is a diagram illustrating a process of processing sound or voice by the message analyzer of FIG. 3.

Referring to FIGS. 4 and 11, the sound processor 121c included in the message analyzer 121 may perform a frequency analysis on sound or voice included in a chat message and determines a user's intention corresponding to the sound or voice.

The sound processor 121c may quantize the sound or voice included in the chat message, perform discrete Fourier transform (DCT) to convert the quantized sound or voice into a frequency domain, select a predetermined number of component values of the frequency domain in order of size and generate a vector vr having the selected component values as elements. That is, the sound processor 121c may generate the vector vr corresponding to the sound or voice.

In addition, the sound processor 121c may select expression items having a sound format from among the registered expression items and create vectors v1, v2, and v3 corresponding to sound of the selected expression items as described above.

For example, the sound processor 121c may generate a first vector v1 corresponding to an expression item to which "sad" is allocated as a representative intention, a second vector v2 corresponding to an expression item to which "happy" is allocated as a representative intention, and a third vector v3 corresponding to an expression item to which "upset" is allocated as a representative intention among the registered expression items in the format of sound.

Next, the sound processor 121c may compare the vector vr corresponding to the sound or voice included in the chat message with the vectors v1 to v3 corresponding to the expression items registered in the format of sound to calculate a similarity and determine a user's intention on the basis of an expression item corresponding to a vector having a highest similarity among the vectors v1 to v3 corresponding to the expression items.

For example, the sound processor 121c may calculate similarities by comparing the vector vr corresponding to the sound or voice included in the chat message with the first to third vectors v1 to v3 and determine "sad", which is the representative intention allocated to the expression item corresponding to the first vector v1, as the user's intention corresponding to the vector vr when the similarity between the first vector v1 and the vector vr among the calculated similarities is highest.

Here, the similarity may be calculated by Equation 1 below.

$$\text{similarity} = \frac{\sum_{i=1}^{n}(vr_i \cdot vx_i)}{\sqrt{\sum_{i=1}^{n}(vr_i)^2} \cdot \sqrt{\sum_{i=1}^{n}(vx_i)^2}}$$ [Equation 1]

In Equation 1, vri may represent an $i^{th}$ component value of the vector vr corresponding to the sound or voice included in the chat message, vxi may represent an $i^{th}$ component value of a vector vx corresponding to sound of a registered expression item, and n may represent the number or length of the component values of the vector vr.

That is, referring to Equation 1, the similarity may be a value obtained by dividing a dot product of the vector vr corresponding to the sound or voice included in the chat message and the vector vx corresponding to the sound of the registered expression item by the size of the vector vr corresponding to the sound or voice included in the chat message and the size of the vector vx corresponding to the sound of the registered expression item.

As a similarity becomes closer to 1, it may be determined that two pieces of compared sound are similar to each other, and as the similarity becomes closer to −1, it may be determined that the two pieces of compared sound are different from each other.

Figure 12:
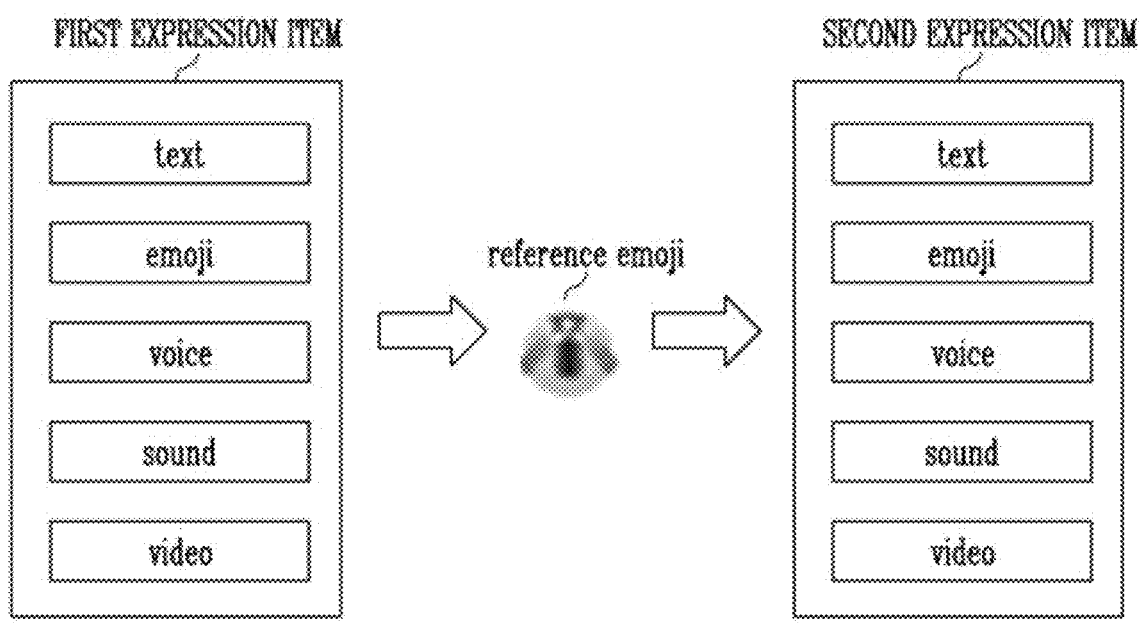
FIG. 12 is a diagram for describing an operation of the artificial intelligence processor of FIG. 3.

FIG. 12 is a diagram for describing an operation of the artificial intelligence processor 122 of FIG. 3.

According to an embodiment, because each expression item has a reference emoji corresponding thereto as an attribute, the expression item may be converted into a reference emoji having an emoji format. In addition, each expression item may be converted into another expression item through the reference emoji.

For example, the message analyzer 121 of FIG. 3 may identify a first expression item included in a chat message and determine a user's intention on the basis of an attribute of the identified first expression item as described above with reference to FIGS. 8 to 9. For example, the message analyzer 121 may determine a user's intention on the basis of an attribute such as a description, a reference emoji, a representative intention, a representative language, or the like allocated to the first expression item.

The artificial intelligence processor 122 of FIG. 3 may convert the first expression item into the reference emoji, which is one of attributes allocated to the first expression item, on the basis of the user's intention determined by the message analyzer 121. In this case, as described above with reference to FIG. 1, the first expression item may have various formats such as text, an emoji, voice, sound, video, or the like.

Next, the artificial intelligence processor 122 may determine a second expression item having a reference emoji that is the same as or similar to the reference emoji converted from the first expression item so as to convert the first expression item into the second expression item.

In other words, the reference emoji may function as a parameter to be used to convert between expression items and may be used to determine a user's intention on the basis of attributes allocated to a plurality of expression items sharing the reference emoji rather than one expression item. In particular, because emojis are standardized through unicode and thus are compatible between a plurality of terminals, when the reference emoji is assigned as an attribute to expression items, it is possible to easily convert between expression items having various formats, e.g., to convert a text type expression item into a sound type expression item.

In an embodiment, reference emojis allocated to expression items may be allocated as expression items in advance with attributes and registered in a chat application. Therefore, converting into a reference emoji may be understood as converting into an expression item in a preset emoji form.

Figure 13:
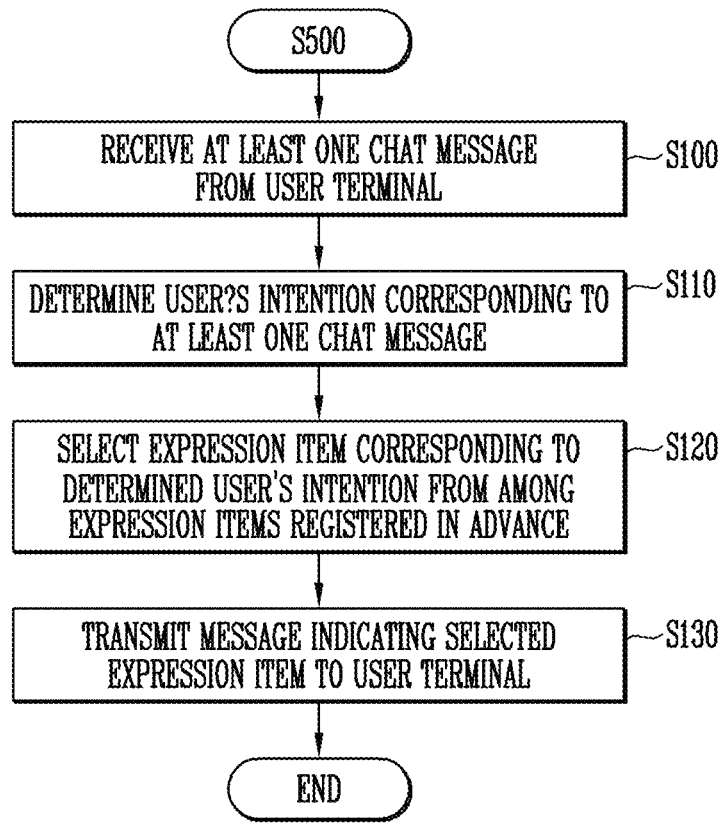
FIG. 13 is a flowchart of an operation of a chat service providing apparatus according to an embodiment.

FIG. 13 is a flowchart of an operation of an apparatus for providing a chat service according to an embodiment.

Referring to FIG. 13, a chat service providing method performed by the chat service providing apparatus 100 may include receiving at least one chat message from a user terminal (S100), determining a user's intention corresponding to the at least one chat message (S110), selecting an expression item corresponding to the determined user's intention from among expression items registered in advance (S120), and transmitting a message indicating the selected expression item to the user terminal (S130).

The chat service providing method may further include receiving at least one expression item from the item registration terminal 200, allocating an attribute to the at least one expression item, and storing the at least one expression item having the attribute allocated thereto in a storage device.

The expression item may include at least one of an emoji, text, voice, sound, a video, and an image that represent at least one of a person's emotion, action, and thought.

The user's intention may include at least one of the user's emotion, action, and thought.

The attribute may include at least one of a description of the expression item, a reference emoji, a representative intention, and a representative language.

The description may include at least one of a name of a character included in the expression item, a situation to which the expression item is applicable, a form of the expression item, and content or format of text included in an image form in the expression item.

The representative language may be a language corresponding to at least one of text, an image, sound, and voice included in the expression item.

The attribute may further include at least one of the number of times the expression item is used, a registration date of the expression item, a data type, a region in which the expression item is used, and a version.

The allocating of the attribute may include receiving a message indicating at least one selected from among emoji-type expression items registered in advance from the item registration terminal 200 and allocating an attribute of the expression item received from the item registration terminal 200 on the basis of a representative intention allocated to the at least one selected expression item.

The receiving of the at least one chat message (S100) may include receiving user information from the user terminal.

The user information may include at least one of a status message recorded on a status window of a chat interface by the user of the user terminal, a profile image set as the user's profile, a background image set as a background of the chat interface, and the user's feedback information regarding a recommended expression item.

The determining of the user's intention (S110) may include determining the user's intention on the basis of the user information. In the determining of the user's intention (S110), the user's intention may be determined on the basis of an attribute assigned to a first expression item.

The determining of the user's intention (S110) may include identifying the first expression item included in at least one chat message and determining the user's intention on the basis of an attribute (e.g., a description, a reference emoji, a representative intention, etc.) allocated to the first expression item.

The determining of the user's intention (S110) may include determining the user's intention to be the same as (or correspond to) a representative intention corresponding to the reference emoji allocated to the first expression item.

The determining of the user's intention (S110) may include identifying text included in at least one chat message and performing natural language processing on at least one sentence generated by combining the identified text.

The determining of the user's intention (S110) may include identifying an image or a video included in at least one chat message and determining the user's intention corresponding to the identified image or video.

The determining of the user's intention (S110) may include identifying sound or voice included in at least one chat message and determining the user's intention corresponding to the identified sound or voice.

The selecting of the expression item corresponding to the user's intention from among the expression items registered in advance (S120) may include selecting a second expression item to which a reference emoji that is the same as or corresponding to the reference emoji allocated to the first expression item from among the expression items registered in advance.

A format of the first expression item may be different from that of the second expression item.

FIG. 14 is a diagram illustrating a hardware configuration of the chat service providing apparatus 400 of FIG. 1.

Referring to FIG. 14, the chat service providing apparatus 400 may include at least one processor 410 and a memory 420 storing instructions instructing the at least one processor 410 to perform at least one operation.

Here, the at least one operation may include operations of the chat service providing apparatus 100 described above with reference to FIGS. 1 to 13. The components of the chat service providing apparatus 100 described above with reference to FIG. 3 may be implemented as software modules executed by the at least one processor 410.

Here, the at least one processor 410 may refer to a central processing unit (CPU), a graphics processing unit (GPU), or a dedicated processor configured to perform methods according to embodiments of the present disclosure. Each of the memory 420 and the storage device 460 may be configured with at least one of a volatile storage medium and a nonvolatile storage medium. For example, the memory 420 may include at least one of a read only memory (ROM) and a random access memory (RAM).

The chat service providing apparatus 400 may further include a transceiver 430 that establishes communication through a wireless network. The chat service providing apparatus 100 may further include an input interface device 440, an output interface device 450, the storage device 460, and the like. The components of the chat service providing apparatus 400 may be connected by a bus 470 to communicate with one another.

Methods according to the present disclosure may be embodied in the form of program instructions executable through various computer means and recorded on a computer-readable recording medium. The computer-readable recording medium may include program instructions, data files, data structures, and the like alone or in combination. The program instructions recorded on the computer-readable recording medium may be specially designed and configured for the disclosure or may be well-known and available to those of ordinary skill in the field of computer software.

Examples of computer-readable recording medium may include hardware devices, such as ROM, RAM, flash memory, and the like, which are specially configured to store and execute program instructions. Examples of the program instructions may include not only machine language codes such as those produced by a compiler but also high-level language code executable by a computer using an interpreter or the like. The above-described hardware device may be configured to operate as at least one software module to perform operations of the present disclosure and vice versa.

In addition, the above-described methods or apparatuses may be implemented by combining all or part of configurations or functions thereof or may be implemented separately.

While embodiments of the present disclosure have been described above, it will be apparent to those of ordinary skill in the art that various modifications and changes may be made therein without departing from the spirit and scope of the present disclosure described in the following claims.

What is claimed is:

1. An apparatus for providing a chat service, comprising:
    a message analyzer configured to identify a first expression item included in at least one previous chat message received from a user terminal, analyze an attribute allocated to the first expression item on the basis of an analysis medium frame, and determine a user's intention according to a result of analyzing the attribute; and
    an artificial intelligence processor configured to recommend a second expression item among a plurality of registered expression items on the basis of a conversion condition, which is an algorithm for selecting an expression item having an attribute corresponding to the user's intention from among the plurality of expression items,
    wherein the analysis medium frame comprises, as an attribute, at least one of a description of an expression item, a reference emoji, a representative intension, and a representative language, and
    wherein the message analyzer comprises an image processor configured to identify an image or a video included in the at least one chat message and perform image recognition on the identified image or video using a neural network to determine the user's intention.

2. The apparatus of claim 1, wherein the description of the expression item comprises at least one of a name of a character included in the expression item, a situation to which the expression item is applicable, a form of the expression item, and text included in an image form in the expression item.

3. The apparatus of claim 1, wherein the message analyzer determines the user's intention on the basis of a reference emoji allocated to the first expression item included in the result of analyzing the attribute.

4. The apparatus of claim 3, wherein the artificial intelligence processor selects, as the second expression item, an expression item having, as an attribute, a reference emoji that is the same as or corresponds to the reference emoji allocated to a first expression item according to the conversion condition from among the plurality of registered expression items.

5. The apparatus of claim 1, wherein each of the plurality of registered expression items is in the form of at least one of an emoji, text, voice, sound, a video, and an image that represent at least one of a person's emotion, action, and thought.

6. The apparatus of claim 5, wherein the artificial intelligence processor selects, as the second expression item, an expression item having a format different from a format of a first expression item from among the plurality of registered expression items according to the conversion condition.

7. The apparatus of claim 1, wherein the artificial intelligence processor updates the conversion condition on the basis of the user's feedback information regarding the second expression item.

8. The apparatus of claim 1, further comprising a database management unit configured to store user information received from the user terminal,
    wherein the user information comprises at least one of a status message recorded on a status window of a chat interface by the user of the user terminal, a profile image set as the user's profile, a background image set as a background of the chat interface, and the user's feedback information regarding the second expression item, and
    the message analyzer determines the user's intention on the basis of a result of analyzing the attribute allocated to the first expression item and the user information.

9. The apparatus of claim 1, wherein the message analyzer comprises a natural language processor configured to identify text included in the at least one chat message and perform natural language processing on at least one sentence generated by combining the text to determine the user's intention.

10. The apparatus of claim 1, wherein the message analyzer comprises a sound processor configured to identify sound or voice included in the at least one chat message and process the sound or the voice with respect to a frequency domain or a time domain to determine the user's intention.

11. The apparatus of claim 1, further comprising a chat interface unit configured to receive the at least one chat message from the user terminal and provide a message including the second expression item to the user terminal.

12. A method of operating an apparatus for providing a chat service, the method comprising:
    identifying a first expression item included in at least one previous chat message received from a user terminal;
    analyzing an attribute allocated to the first expression item on the basis of an analysis medium frame;
    determining a user's intention on the basis of a result of analyzing the attribute;
    recommending a second expression item among a plurality of registered expression items on the basis of a conversion condition which is an algorithm for selecting an expression item having an attribute corresponding to the user's intention from among the plurality of expression items;
    wherein the analysis medium frame comprises, as an attribute, at least one of a description of the expression item, a reference emoji, a representative intension, and a representative language;
    and
    wherein the determining of the user's intention comprises one of:
    identifying text included in the at least one chat message and performing natural language processing on at least one sentence generated by combining the text to determine the user's intention;
    identifying an image or a video included in the at least one chat message and performing image recognition on the identified image or video using a neural network to determine the user's intention; and
    identifying sound or voice included in the at least one chat message and processing the sound or the voice with respect to a frequency domain or a time domain to determine the user's intention.

13. The method of claim 12, wherein the description of the expression item comprises at least one of a name of a character included in the expression item, a situation to which the expression item is applicable, a form of the expression item, and text included in an image form in the expression item.

14. The method of claim 12, wherein the recommending of the second expression item comprises selecting, as the second expression item, an expression item having, as an attribute, a reference emoji that is the same as or corresponds to the reference emoji allocated to a first expression item according to the conversion condition from among the plurality of registered expression items.

15. The method of claim 12, wherein each of the plurality of registered expression items is in the form of at least one of an emoji, text, voice, sound, a video, and an image that represent at least one of a person's emotion, action, and thought.

16. The method of claim 12, wherein the selecting of the second expression item comprises selecting, as the second expression item, an expression item having a format different from a format of an expression item condition from among the plurality of registered expression items according to the conversion condition.

17. The method of claim 12, further comprising receiving user information from the user terminal, and wherein the determining of the user's intention comprises determining the user's intention on the basis of the user information and the attribute allocated to the first expression item,
wherein the user information comprises at least one of a status message recorded on a status window of a chat interface by the user of the user terminal, a profile image set as the user's profile, a background image set as a background of the chat interface, and the user's feedback information regarding the second expression item.

18. The method of claim 12, further comprising:
providing a message including the second expression item to the user terminal; and
updating the conversion condition on the basis of the user's feedback information regarding the second expression item.

* * * * *